(12) United States Patent
Sabi et al.

(10) Patent No.: US 8,551,656 B2
(45) Date of Patent: Oct. 8, 2013

(54) SOLID ELECTROLYTE CELL AND POSITIVE ELECTRODE ACTIVE MATERIAL

(75) Inventors: Yuichi Sabi, Tokyo (JP); Tatsuya Furuya, Kanagawa (JP)

(73) Assignee: Sony Corporation, Tokyo (JP)

( * ) Notice: Subject to any disclaimer, the term of this patent is extended or adjusted under 35 U.S.C. 154(b) by 409 days.

(21) Appl. No.: 12/939,560

(22) Filed: Nov. 4, 2010

(65) Prior Publication Data

US 2011/0117433 A1 May 19, 2011

(30) Foreign Application Priority Data

Nov. 18, 2009 (JP) ................. P2009-263417

(51) Int. Cl.
*H01M 4/13* (2010.01)
(52) U.S. Cl.
USPC .............. 429/220; 429/231.1; 429/231.95; 429/304; 429/233
(58) Field of Classification Search
USPC ............ 429/220, 231.1, 231.95, 304, 233
See application file for complete search history.

(56) References Cited

U.S. PATENT DOCUMENTS

2008/0318126 A1* 12/2008 Ishii .......................... 429/223
2009/0148771 A1* 6/2009 Ishii et al. ............... 429/231.95

FOREIGN PATENT DOCUMENTS

JP 3965657 6/2007

* cited by examiner

*Primary Examiner* — Laura Weiner
(74) *Attorney, Agent, or Firm* — K&L Gates LLP

(57) ABSTRACT

A solid electrolyte cell includes: a positive electrode side layer having a positive electrode active material layer; a negative electrode side layer; and a solid electrolyte layer formed between the positive electrode side layer and the negative electrode side layer, wherein the positive electrode active material layer contains a lithium phosphoric acid compound which is in an amorphous state and is represented by the following formula (1), $$Li_xCu_yPO_4 \qquad (1)$$

where x indicates the compositional ratio of lithium, and y indicates the compositional ratio of copper, x and y being in the ranges of $1.0 \leq x \leq 5.0$ and $1.0 \leq y \leq 4.0$, respectively.

8 Claims, 6 Drawing Sheets

SOLID ELECTROLYTE CELL AND POSITIVE ELECTRODE ACTIVE MATERIAL

CROSS REFERENCES TO RELATED APPLICATIONS

The present application claims priority to Japanese Priority Patent Application JP 2009-263417 filed in the Japan Patent Office on Nov. 18, 2009, the entire content of which is hereby incorporated by reference.

BACKGROUND

The present application relates to a solid electrolyte cell and a positive electrode active material, more particularly to a solid electrolyte cell having a solid electrolyte not containing any organic electrolyte solution and to a positive electrode active material for use in the solid electrolyte cell.

Lithium ion secondary cells and batteries utilizing doping and dedoping of lithium ions are widely used in portable type electronic apparatuses and the like, because of their excellent energy density. Among the lithium ion secondary cells and batteries, totally solid lithium ion secondary cells and batteries using a solid electrolyte not containing an organic electrolyte solution as an electrolyte are under energetic research and development, from the viewpoint of safety and reliability.

As a form of the totally solid lithium ion secondary cell, a thin film lithium secondary cell is under vigorous development. In the thin film lithium secondary cell, the cell components such as current collectors, active materials and an electrolyte are each composed of a thin film to constitute the secondary cell. The thin films constituting the thin film lithium secondary cell are each formed by such a film forming method as sputtering, vapor deposition, and so on (see, for example, Thin-film lithium and lithium-ion batteries, J. B. Bates et al.: Solid State Ionics, 135, 33 (2000)).

In the thin film lithium secondary cell, an amorphous material such as LiPON, obtained or as if obtained by subjecting $Li_3PO_4$ to substitution by nitrogen, and LiBON, obtained or as if obtained by subjecting $Li_xB_2O_3$ to substitution by nitrogen, is used as a solid electrolyte. The amorphous material has an ionic conductivity of about $10^{-6}$ S/cm, which is a very low value as compared with the ionic conductivity level of normal liquid electrolytes of $10^{-2}$ S/cm. Since the film thickness of the solid electrolyte is small (e.g., about 1 μm) and the Li traveling distance is short in the thin film lithium secondary cell, however, the solid electrolyte composed of the amorphous material having the low ionic conductivity can exhibit substantially the same level of performance as those of liquid electrolytes.

On the other hand, in the thin film lithium secondary cell, the component having a rate-determining effect on electrical conduction is the positive electrode active material. In the thin film lithium secondary cell, in general, a lithium-transition metal oxide such as $LiCoO_2$, $LiMn_2O_4$, $LiFePO_4$, etc. is used as the positive electrode active material, like in liquid lithium ion secondary cells. In addition to these related art lithium-transition metal oxides, new lithium-transition metal oxides for use as the positive electrode active material have also been proposed. For instance, Japanese Patent No. 3965657 proposes crystalline $LiCu_{1+x}PO_4$ as a lithium-transition metal oxide for use as the positive electrode active material. These lithium-transition metal oxides (hereinafter referred to as the "above-mentioned lithium-transition metal oxide(s)") are low in ionic conductivity and electronic conductivity.

In the thin film lithium secondary cell, the thickness of the positive electrode active material layer is proportional to the cell capacity. In order to obtain a high capacity, therefore, the positive electrode active material layer is preferably as thick as possible. In the thin film lithium secondary cell, however, thickening of the positive electrode active material layer formed of a material which is low in ionic conductivity and electronic conductivity (for example, to a thickness of 10 μm or more) leads to a very high internal impedance.

Accordingly, it is difficult to put to practical use a high-capacity thin film lithium secondary cell in which the above-mentioned lithium-transition metal oxide low in ionic conductivity and electronic conductivity is used as the positive electrode active material and the thickness of the positive electrode active material layer is enlarged.

Besides, the above-mentioned lithium-transition metal oxides are normally used in a crystalline phase. In the thin film lithium secondary cell, therefore, in forming a film of the above-mentioned lithium-transition metal oxide, a crystalline phase is formed by heating of a substrate during film formation, or by post-annealing after film formation, or the like.

SUMMARY

However, in producing the thin film lithium secondary cell, if substrate heating or post-annealing after film formation is adopted, it may be necessary to use an expensive heat-resistant glass substrate, leading to a rise in production cost. In addition, in the thin film lithium secondary cell, LiPON or LiBON or the like used as the solid electrolyte is a material which functions in an amorphous state, and, therefore, annealing such a material would deteriorate the characteristic properties of the material.

In view of this, as the positive electrode active material, also, a material capable of functioning even in an annealless condition is preferably used. In an annealless condition, however, the lithium-transition metal oxides such as $LiCoO_2$, $LiMn_2O_4$ and $LiFePO_4$ are high in non-crystallinity and are therefore poor in characteristics as a positive electrode active material. More specifically, in the annealless condition, the lithium-transition metal oxides such as $LiCoO_2$, $LiMn_2O_4$ and $LiFePO_4$ are lower in ionic conductivity than such solid electrolytes as LiPON and, hence, are poor in characteristics as a positive electrode active material.

Accordingly, there is a need for a solid electrolyte cell using a positive electrode active material which, in an amorphous state, functions as a positive electrode active material and shows a high ionic conductivity, and a positive electrode active material which has a high ionic conductivity while being in an amorphous state.

In order to solve the above problem, according to an embodiment, there is provided a solid electrolyte cell including: a positive electrode side layer having a positive electrode active material layer; a negative electrode side layer; and a solid electrolyte layer formed between the positive electrode side layer and the negative electrode side layer, wherein the positive electrode active material layer contains a lithium phosphoric acid compound which is in an amorphous state and is represented by the following formula (1), $$Li_xCu_yPO_4 \qquad (1)$$

where x indicates the compositional ratio of lithium, and y indicates the compositional ratio of copper, x and y being in the ranges of $1.0 \leq x \leq 5.0$ and $1.0 \leq y \leq 4.0$, respectively.

According to another embodiment, there is provided a positive electrode active material which is a lithium compound oxide being in an amorphous state and represented by the following formula (1), $$Li_xCu_yPO_4 \qquad (1)$$

where x indicates the compositional ratio of lithium, and y indicates the compositional ratio of copper, x and y being in the ranges of 1.0≤x≤5.0 and 1.0≤y≤4.0, respectively.

In an embodiment, the positive electrode active material includes the lithium compound oxide being in an amorphous state and represented by the above formula (1). The lithium compound oxide being in an amorphous state and represented by the formula (1) functions as a positive electrode active material having a high ionic conductivity while being in the amorphous state.

According to an embodiment, it is possible to provide a solid electrolyte cell in which a positive electrode active material having a high ionic conductivity while being in an amorphous state is used, and a positive electrode active material having a high ionic conductivity while being in an amorphous state.

Additional features and advantages are described herein, and will be apparent from the following Detailed Description and the figures.

DETAILED DESCRIPTION

Embodiments of this application will be described below with reference to the drawings. The description will be made in the following order.

1. First Embodiment (First example of solid electrolyte cell)
2. Second Embodiment (Second example of solid electrolyte cell)
3. Other Embodiments

1. First Embodiment

Figure 1A:
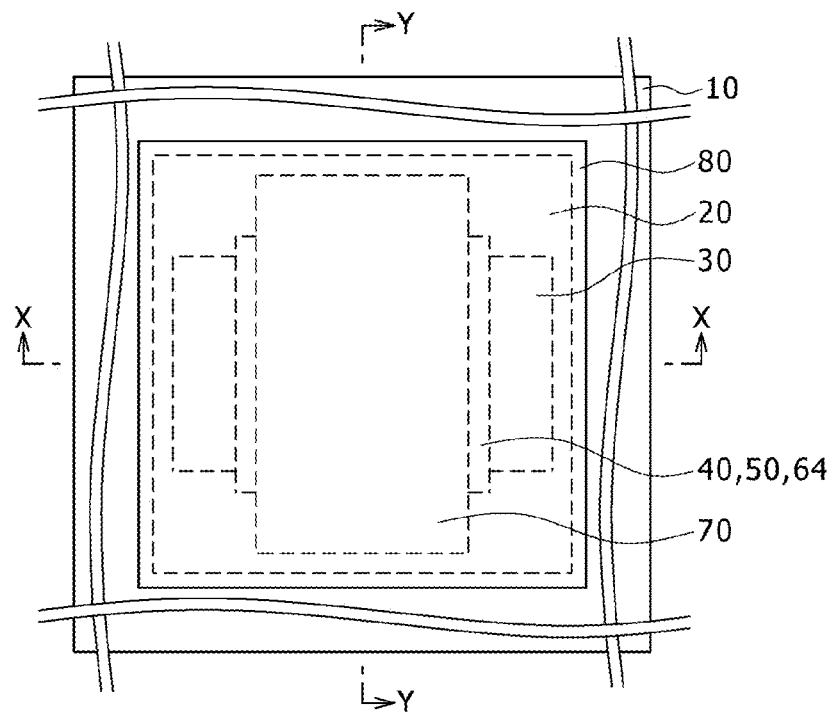
FIGS. 1A to 1C illustrate the configuration of a solid electrolyte cell according to a first embodiment.
Figure 1B:
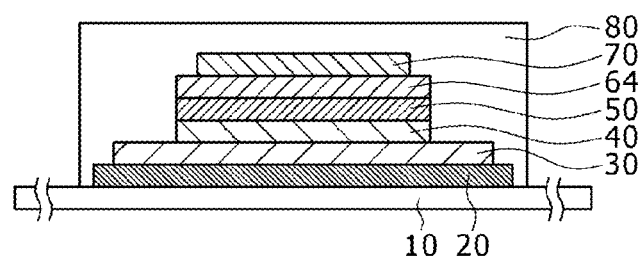
Figure 1C:
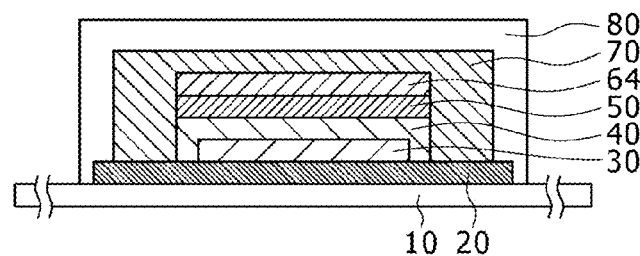

FIGS. 1A to 1C illustrate the configuration of a solid electrolyte cell according to a first embodiment. This solid electrolyte cell is, for example, a solid electrolyte secondary cell capable of being charged and discharged. FIG. 1A is a plan view of the solid electrolyte cell, FIG. 1B is a sectional view taken along line X-X of FIG. 1A, and FIG. 1C is a sectional view taken along line Y-Y of FIG. 1A.

As shown in FIGS. 1A to 1C, the solid electrode cell has an inorganic insulating film 20 formed on a substrate 10, and a stacked body formed on the inorganic insulating film 20, the stacked body including a positive electrode side current collector film 30, a positive electrode active material film 40, a solid electrolyte film 50, a negative electrode potential forming layer 64, and a negative electrode side current collector film 70 which are stacked in this order. An overall protective film 80 having a UV-curing resin, for example, is formed in such a manner as to cover the whole part of the stacked body. Incidentally, an inorganic insulating film 20 may be formed on the overall protective film 80.

Substrate

Examples of a substrate which can be used as the substrate 10 here include polycarbonate (PC) resin substrate, fluoro-resin substrate, polyethylene terephthalate (PET) substrate, polybutylene terephthalate (PBT) substrate, polyimide (PI) substrates, polyamide (PA) substrates, polysulfone (PSF) substrates, polyether-sulfone (PES) substrates, polyphenylene sulfide (PPS) substrate, polyether-ether ketone (PEEK) substrates, polyethylene naphthalate (PEN) substrate, cycloolefin polymer (COP) substrates, etc. The material of the substrate is not particularly limited, but substrates being low in hygroscopicity and having moisture resistance are preferred.

Positive Electrode Side Current Collector Film 30

Examples of the material which can be used to form the positive electrode side current collector film 30 include Cu, Mg, Ti, Fe, Co, Ni, Zn, Al, Ge, In, Au, Pt, Ag, Pd, etc. and alloys containing any of these metals.

Positive Electrode Active Material Film 40

The positive electrode active material film 40 includes a lithium compound oxide being in an amorphous state and represented by the following formula (1),

$$Li_xCu_yPO_4 \quad (1)$$

where x indicates the compositional ratio of lithium, and y indicates the compositional ratio of copper.

The lithium compound oxide represented by the formula (1) and being in an amorphous state has excellent characteristic properties as a positive electrode active material. It has a high potential in relation to the pair $Li^+/Li$. It is excellent in flatness of potential, namely, it shows little variation in potential with variation in composition. It has a high compositional ratio (content) of lithium, which promises a high capacity. It is excellent in charge-discharge cycle characteristic, since it is free of such problem as collapse of a crystal structure upon repetition of charge-discharge cycle, unlike crystalline positive electrode active materials. Further, it can be formed in an annealless mode, which permits a simplified process, an enhanced yield, and utilization of a resin substrate.

In the lithium phosphoric acid compound represented by the formula (1), the compositional ratio or content x of lithium is preferably in the range of 1.0≤x≤5.0, more preferably 1.0≤x≤4.5. If the lithium content x is below 1.0, the impedance is so high that charging/discharging cannot be achieved. While the upper limit for the compositional ratio x of lithium is not particularly limited, the limit within which a favorable potential is maintained may be the upper limit for the compositional ratio x of Li. As far as confirmed by the present inventors, the lithium compositional ratio x is preferably not more than 5.0, more preferably not more than 4.5.

In the lithium phosphoric acid compound of the formula (1), the compositional ratio or content y of copper is preferably in the range of 1.0≤y≤4.0, since a sufficient charge/discharge capacity can be obtained under this condition. Particularly, if the copper content y is reduced to below 1.0, the charge/discharge capacity is decreased sharply. While the upper limit for the compositional ratio y of copper is not particularly limited, an increase of the compositional ratio y beyond 3 results in a gradual lowering in the charge/discharge capacity. When an aim is set at around one half the maximum capacity, the copper compositional ratio y is preferably not more than 4. Where a merit is secured in regard of durability or ionic conductivity or the like, however, a copper content y of more than 4 can be adopted while sacrificing the charge/ discharge capacity. Besides, in the lithium phosphoric acid compound represented by the formula (1), it is more preferable, concerning the lower limit for the content y of copper, that $2.2 \leq y$, since favorable charge-discharge cycle characteristic can be obtained under this condition.

The positive electrode active material film 40 is a completely amorphous, single-phase thin film which does not contain any crystalline phase. The fact that the positive electrode active material film 40 is composed of a single amorphous phase can be confirmed by observing a section of the film 40 under a transmission electron microscope (TEM). When a section of the positive electrode active material film 40 is observed under a TEM, a crystal-grain-free state of the TEM image can be confirmed. In addition, the same fact can also be confirmed from an electron beam diffraction pattern.

Solid Electrolyte Film 50

Examples of the material which can be used to form the solid electrolyte film 50 include lithium phosphate ($Li_3PO_4$), $Li_3PO_{4-x}N_x$ (generally called "LiPON") obtained by addition of nitrogen to lithium phosphate ($Li_3PO_4$), $Li_3PO_{4-y}N_y$, $Li_4SiO_4$—$Li_3PO_4$, $Li_4SiO_4$—$Li_3VO_4$, etc.

Negative Electrode Potential Forming Layer 64

The negative electrode potential forming layer 64 can be formed by using, for example, an oxide containing at least one selected from among Mn, Co, Fe, P, Ni, and Si. Specific examples of the oxide include $LiCoO_2$ and $LiMn_2O_4$. In producing this solid electrolyte cell, a negative electrode active material layer is not formed but, instead, the negative electrode potential forming layer 64 is formed. What is formed on the negative electrode side is Li metal or a layer containing an excess of Li (hereinafter referred to as the "Li excess layer") at an interface on the negative electrode side of the solid electrolyte film 50. While utilizing the excessively deposited Li (Li excess layer), a high durability to repetition of charge-discharge cycle is secured without spoiling charge-discharge characteristic.

Although the negative electrode potential forming layer 64 takes in part of Li during initial charging of the cell, the Li content is maintained at a constant level during the charging/discharging process thereafter, whereby diffusion of Li into the negative electrode side current collector film 70 is restrained effectively. With deterioration of the negative electrode side current collector film 70 thus restrained, extremely favorable repeated charge-discharge characteristics are ensured. Further, a loss of charging amount due to diffusion of Li into the negative electrode side current collector film 70 is minimized effectively. If the negative electrode potential forming layer 64 is absent, Li would diffuse into the negative electrode side current collector film 70, and the total amount of Li cannot be maintained at a constant level during the charging/discharging process of the cell, so that charge-discharge characteristic would be deteriorated.

Incidentally, the thickness of the Li excess layer formed at the interface on the negative electrode side of the solid electrolyte film 50 varies correspondingly to the thickness of the positive electrode active material film 40. However, it suffices for the negative electrode potential forming layer 64 to sufficiently function as a protective film for the Li excess layer formed at the interface on the negative electrode side of the solid electrolyte film 50. Therefore, the thickness of the negative electrode potential forming layer 64 has no direct relation with the thickness of the Li excess layer, and does not depend on the thickness of the positive electrode active material film 40.

In this solid electrolyte cell, use is made of a process in which, where the capacity of the negative electrode active material is less than the amount of Li in the positive electrode active material, that portion of Li which cannot be contained in the negative electrode active material is precipitated to form the Li excess layer, to thereby function as the negative electrode active material. In the solid electrolyte cell, the thickness of the negative electrode potential forming layer 64 is set to be sufficiently smaller than the thickness of the positive electrode active material film 40 so that the negative electrode active material is substantially absent in a non-charged state.

The negative electrode potential forming layer 64 may be formed of a material which is utilized as the negative electrode active material. In this case, more accurately speaking, a portion of the material functions as the negative electrode active material and the remainder functions as a protective film for the Li excess layer. In the case where the thickness of the negative electrode potential forming layer 64 is sufficiently smaller than the thickness of the positive electrode active material film 40, most of the negative electrode potential forming layer 64 is used as the protective film.

In this solid electrolyte cell, a configuration is adopted in which the negative electrode potential forming layer 64 is formed to be sufficiently thinner than the positive electrode active material film 40 so that the Li excess layer, formed by precipitation at the interface and functioning as the negative electrode active material, accounts for not less than one half of driving of the cell.

Negative Electrode Side Current Collector Film 70

Examples of the material which can be used to form the negative electrode side current collector film 70 include Cu, Mg, Ti, Fe, Co, Ni, Zn, Al, Ge, In, Au, Pt, Ag, Pd, etc. and alloys containing any of these metals.

Inorganic Insulating Film 20

The material constituting the inorganic insulating film 20 may be any material that can form a film being low in hygroscopicity and having moisture resistance. Examples of the material include oxides, nitrides and sulfides of any of Si, Cr, Zr, Al, Ta, Ti, Mn, Mg, and Zn, which may be used either singly or in mixture of some of them. More specific examples of the material include $Si_3N_4$, $SiO_2$, $Cr_2O_3$, $ZrO_2$, $Al_2O_3$, $TaO_2$, $TiO_2$, $Mn_2O_3$, MgO, ZnS, etc. and mixtures thereof.

Method of Manufacturing Solid Electrolyte Cell

The solid electrolyte cell as above-described is manufactured, for example, in the following manner.

First, an inorganic insulating film 20 is formed on a substrate 10. Next, a positive electrode side current collector film 30, a positive electrode active material film 40, a solid electrolyte film 50, a negative electrode potential forming layer 64, and a negative electrode side current collector 70 are sequentially formed over the inorganic insulating film 20, to thereby form a stacked body. Subsequently, an overall protective film 80 having a UV-curing resin, for example, is formed over the substrate (organic insulating substrate) 10 so as to cover the stacked body and the inorganic insulating film 20 entirely. By a series of steps as just-mentioned, a solid electrolyte cell according to the first embodiment can be fabricated.

Methods for Forming Thin Films

Methods for forming the inorganic insulating film 20, the positive electrode side current collector film 30, the positive electrode active material film 40, the solid electrolyte film 50, the negative electrode potential forming layer 64, and the negative electrode side current collector film 70 will be described.

Each of the thin films can be formed, for example, by a vapor phase method such as physical vapor deposition (PVD) and chemical vapor deposition (CVD). Besides, each thin film can also be formed by a liquid phase method such as electroplating, electroless plating, coating, and a sol-gel method. Furthermore, each thin film can be formed by a solid phase method such as solid phase epitaxy (SPE) and the Langmuir-Blodgett (LB) method.

The PVD method is a method in which a thin film material to be formed into a thin film is once evaporated (gasified) by such energy as heat and plasma, before being deposited as a thin film on a substrate. Examples of the PVD method include vacuum evaporation, sputtering, ion plating, molecular beam epitaxy (MBE), and laser ablation.

The CVD method is a method in which such energy as heat, light and plasma is applied to thin film component materials supplied as gases to cause decomposition and/or reaction of the raw material gases, thereby forming an intermediate product(s), and a thin film is deposited on a substrate surface through adsorption, reaction and/or desorption (release).

Examples of the CVD method include thermal CVD, metal organic chemical vapor deposition (MOCVD), RF plasma enhanced CVD, photo assisted CVD, laser assisted CVD, and liquid phase epitaxy (LPE).

It is easy for those skilled in the art to form the inorganic insulating film 20, the positive electrode side current collector film 30, the positive electrode active material film 40, the solid electrolyte film 50, the negative electrode potential forming layer 64, and the negative electrode side current collector film 70 of desired configurations by the above-mentioned thin film forming methods. Specifically, by appropriately selecting the thin film raw materials, the thin film forming methods, the thin film forming conditions or the like, those skilled in the art can easily form the inorganic insulating film 20, the positive electrode side current collector film 30, the positive electrode active material film 40, the solid electrolyte film 50, the negative electrode potential forming layer 64, and the negative electrode side current collector film 70 having desired configurations.

Effect

In the first embodiment, the positive electrode active material film 40 includes a lithium compound oxide being in an amorphous state and represented by the above formula (1). This makes it possible to obtain a solid electrolyte cell having excellent characteristics.

In addition, in the first embodiment, the positive electrode active material film 40 functions as a positive electrode active material even under an annealless condition. This eliminates the need to use an expensive heat-resistant glass substrate as the substrate 10, so that the manufacturing cost of the solid electrolyte cell can be reduced.

2. Second Embodiment

Figure 2A:
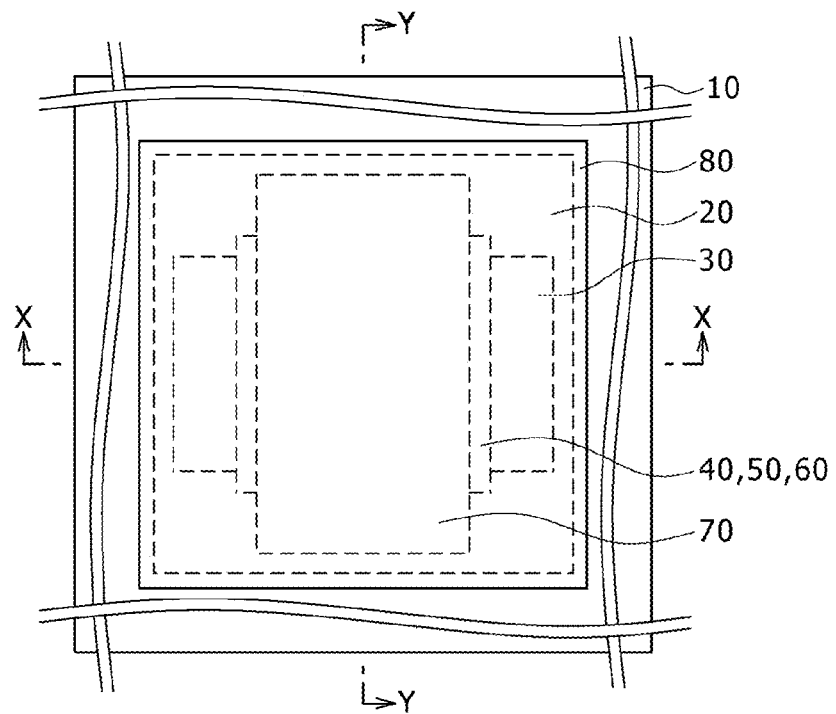
FIGS. 2A to 2C illustrate the configuration of a solid electrode cell according to a second embodiment.
Figure 2B:
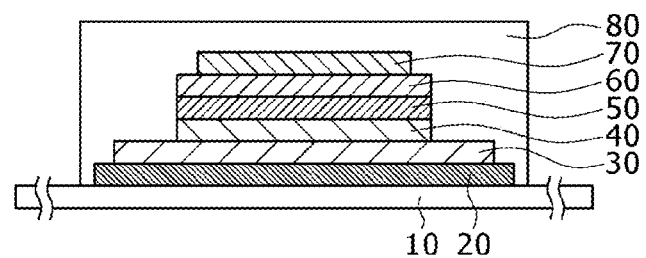
Figure 2C:
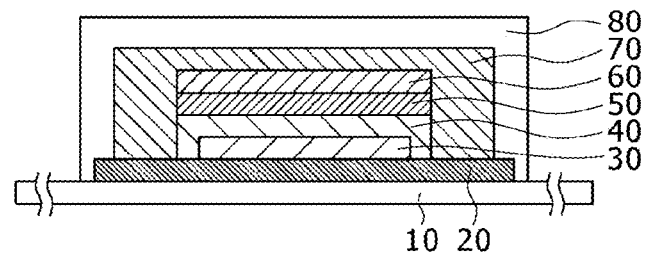

A solid electrolyte cell according to a second embodiment will now be described. This solid electrolyte cell is, for example, a solid electrolyte secondary cell capable of being charged and discharged. FIGS. 2A to 2C illustrate a solid electrolyte cell according to the second embodiment. FIG. 2A is a plan view of the solid electrolyte cell, FIG. 2B is a sectional view taken along line X-X of FIG. 2A, and FIG. 2C is a sectional view taken along line Y-Y of FIG. 2A.

This solid electrolyte cell has an inorganic insulating film 20 formed on a substrate 10, and a stacked body formed on the inorganic insulating film 20, the stacked body including a positive electrode side current collector film 30, a positive electrode active material film 40, a solid electrolyte film 50, a negative electrode active material film 60, and a negative electrode side current collector film 70 which are stacked in this order. An overall protective film 80 having a UV-curing resin, for example, is formed so as to cover the stacked body and the inorganic insulating film 20 entirely. Incidentally, an inorganic insulating film 20 may be formed on the overall protective film 80.

The substrate 10, the inorganic insulating film 20, the positive electrode side current collector film 30, the positive electrode active material film 40, the solid electrolyte film 50, the negative electrode side current collector film 70 are the same as in the first embodiment, and, therefore, detailed descriptions of these components are omitted here. The negative electrode active material film 60 has the following configuration.

Negative Electrode Active Material Film

The material constituting the negative electrode active material film 60 may be any material that permits easy occlusion and release of lithium ions into and out of itself, thereby permitting a large amount of lithium ions to be occluded into and released from the negative electrode active material film. Examples of such a material include oxides of any of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, Zn, etc. Besides, mixtures of these oxides can also be used.

Specific examples of the material for the negative electrode active material film 60 include silicon-manganese alloy (Si—Mn), silicon-cobalt alloy (Si—Co), silicon-nickel alloy (Si—Ni), niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), Sn-added indium oxide (ITO), Al-added zinc oxide (AZO), Ga-added zinc oxide (GZO), Sn-added tin oxide (ATO), F (fluorine)-added tin oxide (FTO), etc. Besides, mixtures of these can also be used.

Method for Manufacturing Solid Electrolyte Cell

The solid electrolyte cell as above-described is manufactured, for example, in the following manner.

First, an inorganic insulating film 20 is formed on a substrate 10. Next, a positive electrode side current collector film 30, a positive electrode active material film 40, a solid electrolyte film 50, a negative electrode active material film 60, and a negative electrode side current collector film 70 are sequentially formed over the inorganic insulating film 20, to thereby form a stacked body. Subsequently, an overall protective film 80 having a UV-curing resin, for example, is formed on the substrate 10 so as to cover the stacked body and the inorganic insulating film 20 entirely. By a series of steps as just-mentioned, a solid electrolyte cell according to the second embodiment can be fabricated.

Effect

The second embodiment has substantially the same effect as that of the first embodiment.

EXAMPLES

Now, the present application will be specifically described by showing Examples, which are not limitative of the application.

Example 1

A solid electrolyte cell having the configuration as illustrated in FIGS. 1A to 1C was produced. A polycarbonate (PC) substrate having a thickness of 1.1 mm was used as a substrate 10. A film of SCZ ($SiO_2$—$Cr_2O_3$—$ZrO_2$) was formed as an inorganic insulating film 20 on the substrate 10.

With a metallic mask disposed over the inorganic insulating film 20, a positive electrode side current collector film 30 was formed in a predetermined region, and then a positive electrode active material film 40, a solid electrolyte film 50, a negative electrode potential forming layer 64, and a negative electrode side current collector film 70 are formed in this order, to form a stacked body on the inorganic insulating film 20. A Ti film was formed as the positive electrode side current collector film 30, a $Li_xCu_yPO_4$ film as the positive electrode active material film 40, a $Li_3PO_{4-x}N_x$ film as the solid electrolyte film 50, a $LiCoO_2$ film as the negative electrode potential forming layer 64, and a Ti film was formed as the negative electrode side current collector film 70.

The film forming conditions for the inorganic insulating film 20 and the thin films constituting the stacked body were set as follows. Incidentally, the substrate 10 was not heated but, instead, a substrate holder was water cooled at 20° C. during film formation.

Inorganic Insulating Film 20

The inorganic insulating film 20 was formed by use of the following sputtering system and under the following film forming conditions.
Sputtering system: C-3103 (ANELVA Corp.)
Target composition: SCZ ($SiO_2$(35 at %)+$Cr_2O_3$(30 at %)+$ZrO_2$(35 at %))
Target size: Φ6 inch
Sputtering gas: Ar 100 sccm, 0.13 Pa
Sputtering power: 1000 W (RF)

Positive Electrode Side Current Collector Film 30

The positive electrode side current collector film 30 was formed by use of the following sputtering system and under the following film forming conditions.
Sputtering system: SMO-01 special type (ULVAC, Inc.)
Target composition: Ti
Target size: Φ4 inch
Sputtering gas: Ar 70 sccm, 0.45 Pa
Sputtering power: 1000 W (DC)
Film thickness: 100 nm Positive Electrode Active Material Film 40

The positive electrode active material film 40 was formed by use of the following sputtering system and under the following film forming conditions.
Sputtering system: SMO-01 special type (ULVAC, Inc.)
Target composition: $Li_3PO_4$ and Cu (co-sputtering)
Target size: Φ4 inch
Sputtering gas: Ar(80%)+$O_2$(20%), 20 sccm, 0.20 Pa
Sputtering power: $Li_3PO_4$ 600 W (RF), Cu 50 W (DC)
Film thickness: 350 nm Solid Electrolyte Film 50

The solid electrolyte film 50 was formed by use of the following sputtering system and under the following film forming conditions.
Sputtering system: SMO-01 special type (ULVAC, Inc.)
Target composition: $Li_3PO_4$
Target size: Φ4 inch
Sputtering gas: Ar 20 sccm+$N_2$ 20 sccm, 0.26 Pa
Sputtering power: 600 W (RF)
Film thickness: 400 nm Negative Electrode Potential Forming Layer 64

The negative electrode potential forming layer 64 was formed by use of the following sputtering system and under the following film forming conditions.
Sputtering system: SMO-01 special type (ULVAC, Inc.)
Target composition: $LiCoO_2$
Target size: Φ4 inch
Sputtering gas: Ar(80%)+$O_2$(20%), 20 sccm, 0.20 Pa
Sputtering power: 300 W (RF)
Film thickness: 10 nm Negative Electrode Side Current Collector Film 70

The negative electrode side current collector film 70 was formed by use of the following sputtering system and under the following film forming conditions.
Sputtering system: SMO-01 special type (ULVAC, Inc.)
Target composition: Ti
Target size: Φ4 inch
Sputtering gas: Ar 70 sccm, 0.45 Pa
Sputtering power: 1000 W (DC)
Film thickness: 200 nm Finally, the overall protective film 80 was formed by use of a UV-curing resin (product code: SK3200, a product by Sony Chemical & Information Device Corp.), and, further, an inorganic insulating film was formed on the UV-curing resin under the same film forming conditions as above. By these steps, a solid electrolyte cell according to Example 1 was obtained. Specifically, a solid electrolyte cell of Example 1 having the following film configuration was obtained.

Film Configuration of Solid Electrolyte Cell
Polycarbonate substrate/SCZ (50 nm)/Ti (100 nm)/$Li_xCu_yPO_4$ (350 nm)/$Li_3PO_{4-x}N_x$ (400 nm)/$LiCoO_2$ (10 nm)/Ti (200 nm)/UV-curing resin (20 μm)/SCZ (50 nm)

Analysis of Positive Electrode Active Material Film 40

XPS Analysis

An analysis of the positive electrode active material film 40 was conducted in the following manner. A monolayer film being equivalent to the positive electrode active material film 40 was formed on a quartz glass under the same film forming conditions as those for the positive electrode active material film 40. The chemical composition of the monolayer film was analyzed by X-ray photoelectron spectroscopy (XPS). The composition of the monolayer film was found to be $Li_{2.2}Cu_{2.2}PO_{4.0}$.

TEM Analysis

In addition, a section of the monolayer film was observed under a transmission electron microscope (TEM). The results are shown in FIGS. 3A and 3B, wherein FIG. 3A shows a TEM image as observed under the TEM, and FIG. 3B shows an electron diffraction pattern.

Figure 3A:
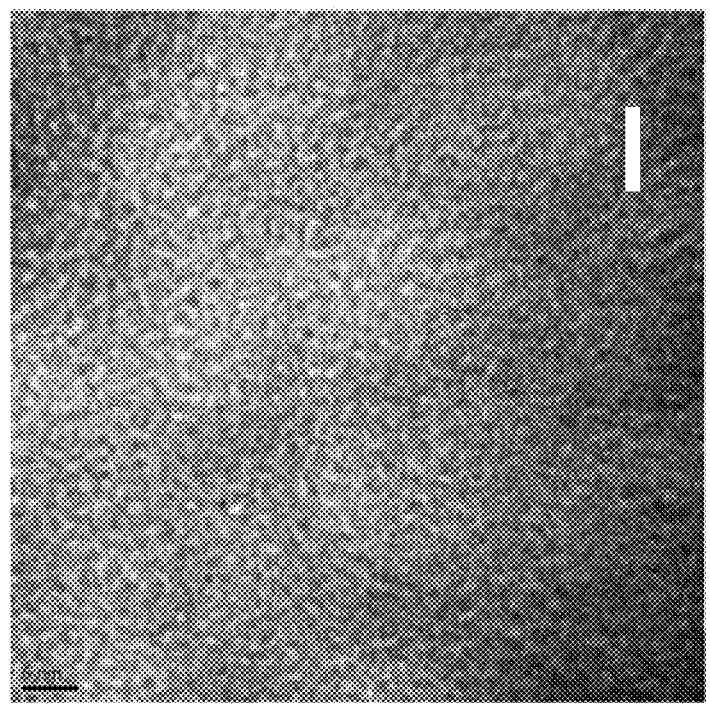
FIGS. 3A and 3B are a TEM image and an electron diffraction pattern of a section of a positive electrode active material layer.
Figure 3B:
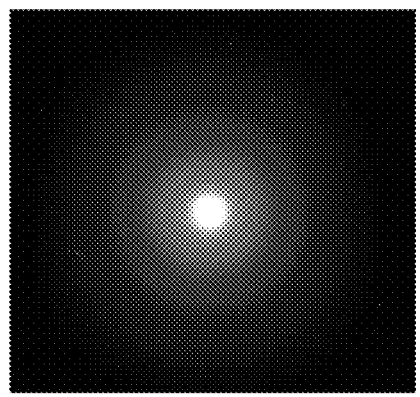

As shown in FIG. 3A, no crystal grain was observed in the TEM image. Besides, as shown in FIG. 3B, a halo ring indicative of an amorphous state was observed in the electron diffraction pattern. By this, it was confirmed that the positive electrode active material film 40 was amorphous.

Charge-Discharge Test

Figure 4:
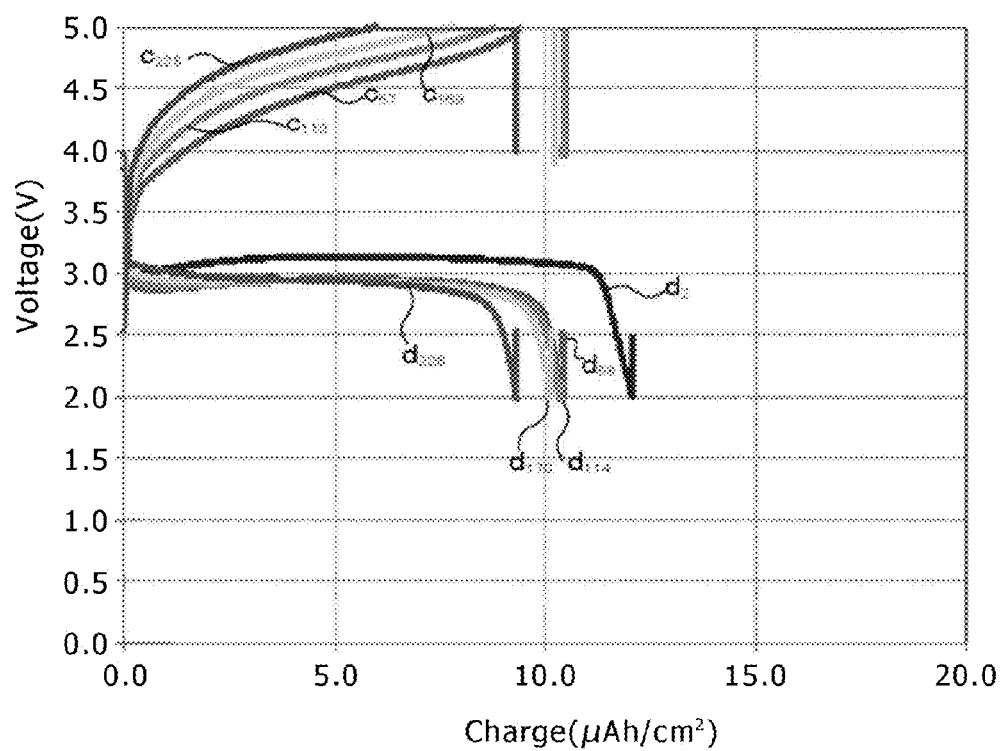
FIG. 4 is a graph showing charge-discharge curves for Example 1.

The solid electrolyte cell of Example 1 was served to a charge-discharge test. Charging was conducted at a charge current of 50 μA and a charge cutoff voltage of 5 V. Discharging was performed at a discharge current of 50 μA and a discharge cutoff voltage of 2 V. Incidentally, 50 μA corresponds to 5 C (a current value at which a theoretical capacity is charged or discharged in 0.2 hours). The measurement results are shown in FIG. 4. Incidentally, in FIG. 4, line $c_x$ is a charge curve. Suffix x is an odd number, and line $c_x$ is a charge curve for the {(x+1)/2}th charging. Line $d_y$ is a discharge curve. Suffix y is an even number, and line $d_y$ is a discharge curve for (y/2)th discharging after initial charging (the same applies also to FIGS. 5 and 7).

As shown in FIG. 4, the solid electrolyte cell of Example 1 was excellent in flatness of discharge potential in the vicinity of 3 V. Besides, the positive electrode active material showed good characteristics in response to repetition of charging and discharging.

Example 2

A solid electrolyte cell of Example 2 was produced in the same manner as in Example 1, except that a positive electrode active material film 40 was formed under the following film forming conditions.

Positive Electrode Active Material Film 40

The positive electrode active material film 40 was formed on a positive electrode side current collector film 30 under the following film forming conditions.

Sputtering system: SMO-01 special type (ULVAC, Inc.)
Target composition: $Li_3PO_4$ and Cu (co-sputtering)
Target size: Φ4 inch
Sputtering gas: Ar(80%)+$O_2$(20%), 20 sccm, 0.20 Pa
Sputtering power: $Li_3PO_4$ 600 W (RF), Cu 70 W (DC)
Film thickness: 370 nm Analysis of Positive Electrode Active Material Film 40

XPS Analysis

In the same manner as in Example 1, chemical composition analysis was conducted by XPS. As a result, the composition of a monolayer equivalent to the positive electrode active material film 40 was found to be $Li_{2.2}Cu_{3.3}PO_{4.0}$.

TEM Analysis

In addition, the monolayer film was observed under a TEM. In the same manner as in Example 1, no crystal grain was observed in a TEM image, and a halo ring indicative of an amorphous state was observed in an electron diffraction pattern. From these results, it was confirmed that the positive electrode active material film 40 was amorphous.

Charge-Discharge Test

In the same manner as in Example 1, a charge-discharge test was carried out. Measurement results are shown in FIG. 5.

Figure 5:
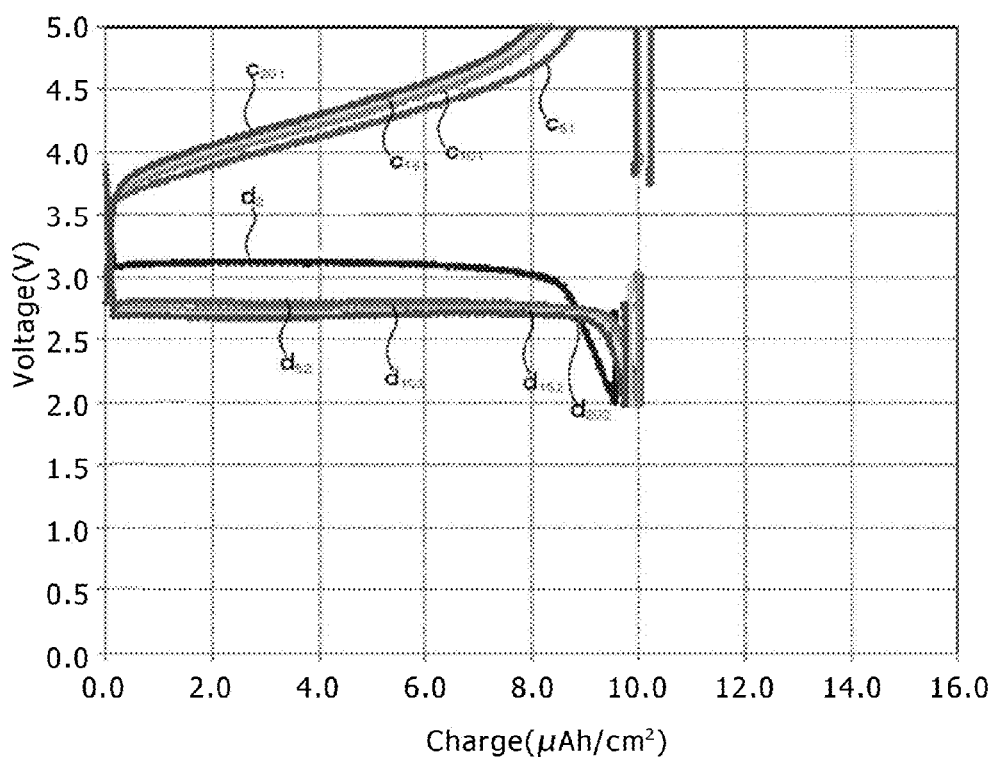
FIG. 5 is a graph showing charge-discharge curves for Example 2.

As shown in FIG. 5, the solid electrolyte cell of Example 2 was excellent in flatness of discharge potential in the vicinity of 3 V. Besides, the positive electrode active material showed good characteristics in response to repetition of charging and discharging.

Investigation of Compositional Ratio x of Lithium

From calculations based on the discharge capacity and the film composition of the positive electrode active material film 40 before charging, it is seen that the compositional ratio or content x of lithium in a fully charged state is 1.0. As shown in FIGS. 4 and 5, as the charging proceeds, the compositional ratio x of lithium gradually decreases from the compositional ratio value upon film formation. When the compositional ratio x of lithium decreases to a value in the vicinity of x=1.0, the impedance is raised, and the voltage at the time of charging is raised, whereby the charging is completed. From this, it is seen that if the content x of lithium in $Li_xCu_yPO_4$ constituting the positive electrode active material film 40 is less than 1.0 after formation of the positive electrode active material film 40 (before charging), the impedance is so high that charging does not proceed, and the solid electrolyte cell cannot function as a cell. It is understood, therefore, that the compositional ratio x of lithium in $Li_xCu_yPO_4$ constituting the positive electrode active material film 40 is preferably not less than 1.0. It is to be noted here, however, that a function as a cell cannot be attained if x=1 before the start of charging. From the viewpoint of cell capacity, therefore, the compositional ratio x is preferably greater than 1.

It was confirmed that driving of the cell is possible when the compositional ratio x of lithium in $Li_xCu_yPO_4$ constituting the positive electrode active material film 40 is in the range of up to x=3. $Li_xCu_yPO_4$ with a lithium compositional ratio x of more than 3 can be realized by enhancing the composition of Li in the sputtering target. Samples so configured that Li can be externally introduced into the positive electrode active material $Li_{2.2}Cu_{3.3}PO_4$ in Example 2 were produced, and variations in potential were measured. As a result, it was found that while the lithium compositional ratio x is in the range of up to x=4.5, the variations in the potential of the cells using the positive electrode active material were within 2 V from an initial value. From this, it was confirmed that $Li_xCu_yPO_4$ can function until the lithium compositional ratio x exceeds an upper limit of x=4.5; in other words, the compositional ratio x of lithium is preferably in the range of x≤4.5.

Test Example

A plurality of samples (solid electrolyte cells) in which the compositional ratio or content y of copper in $Li_xCu_yPO_4$ constituting the positive electrode active material film 40 was varied were produced, and the samples were served to measurement of charge/discharge capacity.

The film configuration in each of the samples was the same as in Example 1. Namely, the film composition was polycarbonate substrate/SCZ (50 nm)/Ti (100 nm)/$Li_xCu_yPO_4$ (350 nm)/$Li_3PO_{4-x}N_x$ (400 nm)/$LiCoO_2$ (10 nm)/Ti (200 nm)/UV-curing resin (20 μm)/SCZ (50 nm).

In the film forming conditions for the positive electrode active material film 40, the sputtering power was appropriately varied from sample to sample. In this manner, a plurality of samples differing in the compositional ratio or content y of copper in $Li_xCu_yPO_4$ constituting the positive electrode active material film 40 were produced. Each of the samples thus produced was charged and discharged under the same conditions as in Example 1, and the charge/discharge capacity in this instance was determined for each sample. Measurement results are shown in FIG. 6.

Figure 6:
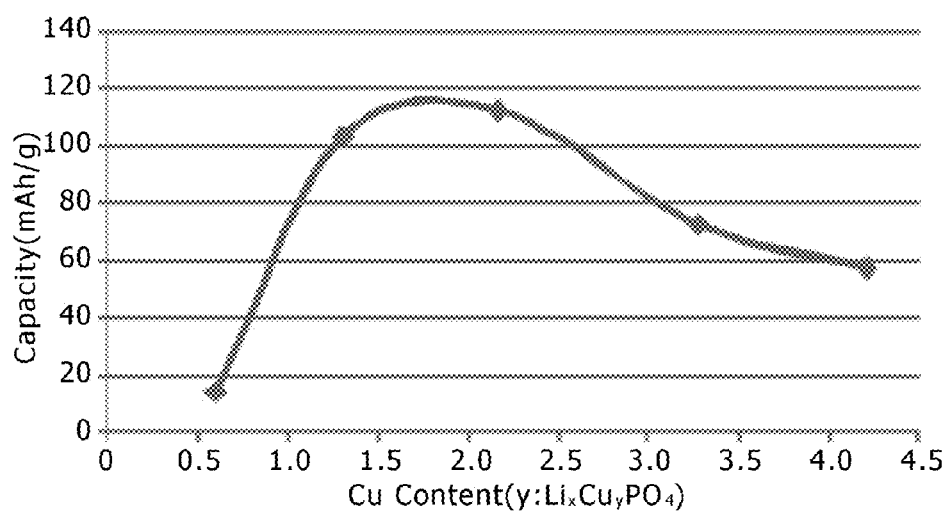
FIG. 6 is a graph showing measurement results of test examples.

As shown in FIG. 6, when the compositional ratio (content) y of copper in $Li_xCu_yPO_4$ constituting the positive electrode active material film 40 decreases below 1.0, the capacity is lowered sharply. It was verified, therefore, that the content y of copper in $Li_xCu_yPO_4$ constituting the positive electrode active material film 40 is preferably not less than 1.0. In addition, the capacity increased when the copper content y was in the range from 1.0 to 2.2, and the capacity per unit weight was lowered when the copper content y exceeded a value of around 2.2. The reason lies in that an increase in the compositional ratio (content) y of copper in the positive electrode active material raised the weight density, but, on the other hand, it lowered the compositional ratio (content) x of lithium which can be contained in the positive electrode active material. Besides, when the copper content y exceeds 4.0, the capacity would be not more than one half the capacity at around a copper content y=2.2 where a maximum capacity can be obtained. From these results, it was found that the compositional ratio (content) y of copper in $Li_xCu_yPO_4$ is preferably in the range of 1.0≤y≤4.0.

Example 3

A solid electrolyte cell of Example 3 was produced in the same manner as in Example 1, except that a positive electrode active material film 40 was produced under the following film forming conditions.

Positive Electrode Active Material Film 40

The positive electrode active material film 40 was formed by use of the following sputtering system and under the following film forming conditions.

Sputtering system: SMO-01 special type (ULVAC, Inc.)
Target composition: $Li_3PO_4$ and Cu (co-sputtering)
Target size: Φ4 inch
Sputtering gas: Ar(80%)+$O_2$(20%), 20 sccm, 0.20 Pa
Sputtering power: $Li_3PO_4$ 600 W (RF), Cu 40 W (DC)
Film thickness: 270 nm Analysis of Positive Electrode Active Material Film 40

XPS Analysis

In the same manner as in Example 1, chemical composition analysis was performed by XPS. As a result, the composition of a monolayer film equivalent to the positive electrode active material film 40 was found to be $Li_{2.2}Cu_{1.3}PO_{4.0}$.

Charge-Discharge Test

In the same manner as in Example 1, a charge-discharge test was conducted. The measurement results are shown in FIG. 7.

Figure 7:
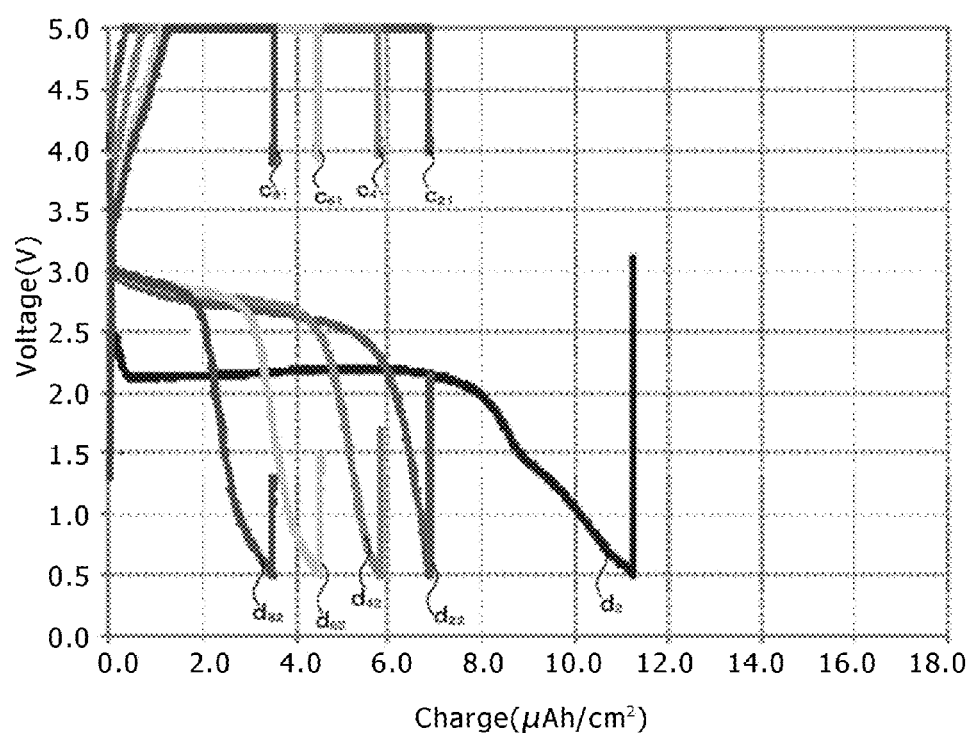
FIG. 7 is a graph showing charge-discharge curves for Example 3.

As shown in FIG. 7, in the solid electrolyte cell of Example 3, initial charge-discharge behaviors were good, durability to repetition of charging and discharging (charge-discharge cycle characteristic) was poor, and the cell capacity was lowered to or below one half the original capacity, upon repetition of the cycle several tens of times. Specifically, when the compositional ratio y of copper in $Li_xCu_yPO_4$ constituting the positive electrode active material film 40 was 1.3 as in Example 3, the charge-discharge cycle characteristic was poor. On the other hand, when the content y of copper in $Li_xCu_yPO_4$ constituting the positive electrode active material film 40 was 2.2 as in Example 1 above, charge-discharge cycle could be repeated not less than 100 times (see FIG. 4). Accordingly, it was found that, from the viewpoint of charge-discharge cycle characteristic, the compositional ratio y of copper in $Li_xCu_yPO_4$ constituting the positive electrode active material film 40 is preferably in the range of $2.2 \leq y$.

3. Other Embodiments

The present application is not limited to the above-described embodiments of the application, and various modifications and applications are possible without departure from the scope of the application. For instance, the film configuration of the solid electrolyte cell is not limited to the above-described. For example, configurations obtained by omitting the inorganic insulating film from the configurations according to the first to third embodiments may be adopted.

In addition, a configuration may be adopted in which a plurality of stacked bodies are sequentially stacked, they are electrically connected in series with one another, and they are entirely covered by the overall protective film 80. Besides, a configuration may be adopted in which a plurality of stacked bodies are juxtaposedly formed on a substrate, they are electrically connected in parallel or in series with one another, and they are covered by the overall protective film 80.

In addition, for example, the configuration of the solid electrolyte cell is not limited to the above-described. For instance, the present application is also applicable to a solid electrolyte cell having a structure in which a conductive material is used for the substrate 10 and the positive electrode current collector film 30 is omitted, and the like. Further, for example, the positive electrode side current collector film 30 may include a metallic plate formed from a positive electrode current collector material. Similarly, the negative electrode side current collector film 70 may include a metallic plate formed from a negative electrode current collector material.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A solid electrolyte cell comprising:
a positive electrode side layer having a positive electrode active material layer;
a negative electrode side layer; and
a solid electrolyte layer formed between the positive electrode side layer and the negative electrode side layer, wherein
the positive electrode active material layer contains a lithium phosphoric acid compound which is in an amorphous state and is represented by the following formula (1), $$Li_xCu_yPO4 \qquad (1)$$

where x indicates the compositional ratio of lithium, and y indicates the compositional ratio of copper, x and y being in the ranges of $1.0 \leq x \leq 5.0$ and $1.0 \leq y \leq 4.0$, respectively; wherein the negative electrode side layer includes a negative electrode current collector layer and an oxide-containing layer; and
a lithium-containing layer is formed at an interface on the negative electrode side of the solid electrolyte layer at the time of charging.

2. The solid electrolyte cell according to claim 1, wherein the positive electrode side layer includes the positive electrode active material layer and a positive electrode current collector layer.

3. The solid electrolyte cell according to claim 1, wherein the negative electrode side layer includes a negative electrode current collector layer and a negative electrode active material layer.

4. The solid electrolyte cell according to claim 1, wherein a layer constituting the positive electrode side layer, a layer constituting the negative electrode side layer, and the solid electrolyte layer each include a film.

5. The solid electrolyte cell according to claim 1, wherein the positive electrode active material layer comprises a single-phase thin film that does not contain a crystalline phase.

6. The solid electrolyte cell according to claim 1, wherein the solid electrolyte layer comprises a material selected from the group consisting of: $Li_3PO_4$, $SiO_4$—$Li_3PO_4$ and $Li_4SiO_4$—$Li_3PO_4$.

7. A solid electrolyte cell comprising:
a positive electrode side layer having a positive electrode active material layer;
a negative electrode side layer; and
a solid electrolyte layer formed between the positive electrode side layer and the negative electrode side layer, wherein
the positive electrode active material layer contains a lithium phosphoric acid compound which is in an amorphous state and is represented by the following formula (1), $$Li_xCu_yPO4 \qquad (1)$$

where x indicates the compositional ratio of lithium, and y indicates the compositional ratio of copper, x and y being in the ranges $1.0 \leq x \leq 5.0$ and $2.2 \leq y \leq 4.0$, respectively.

8. A positive electrode active material which is a lithium compound oxide being in an amorphous state and represented by the following formula (1), $$Li_xCu_yPO4 \qquad (1)$$

where x indicates the compositional ratio of lithium, and y indicates the compositional ratio of copper, x and y being in the ranges of $1.0 \leq x \leq 5.0$ and $2.2 \leq y \leq 4.0$, respectively.

\* \* \* \* \*